(No Model.)
W. C. TYLER.
FRICTION BRAKE FOR STEERING WHEELS.
No. 253,644. Patented Feb. 14, 1882.
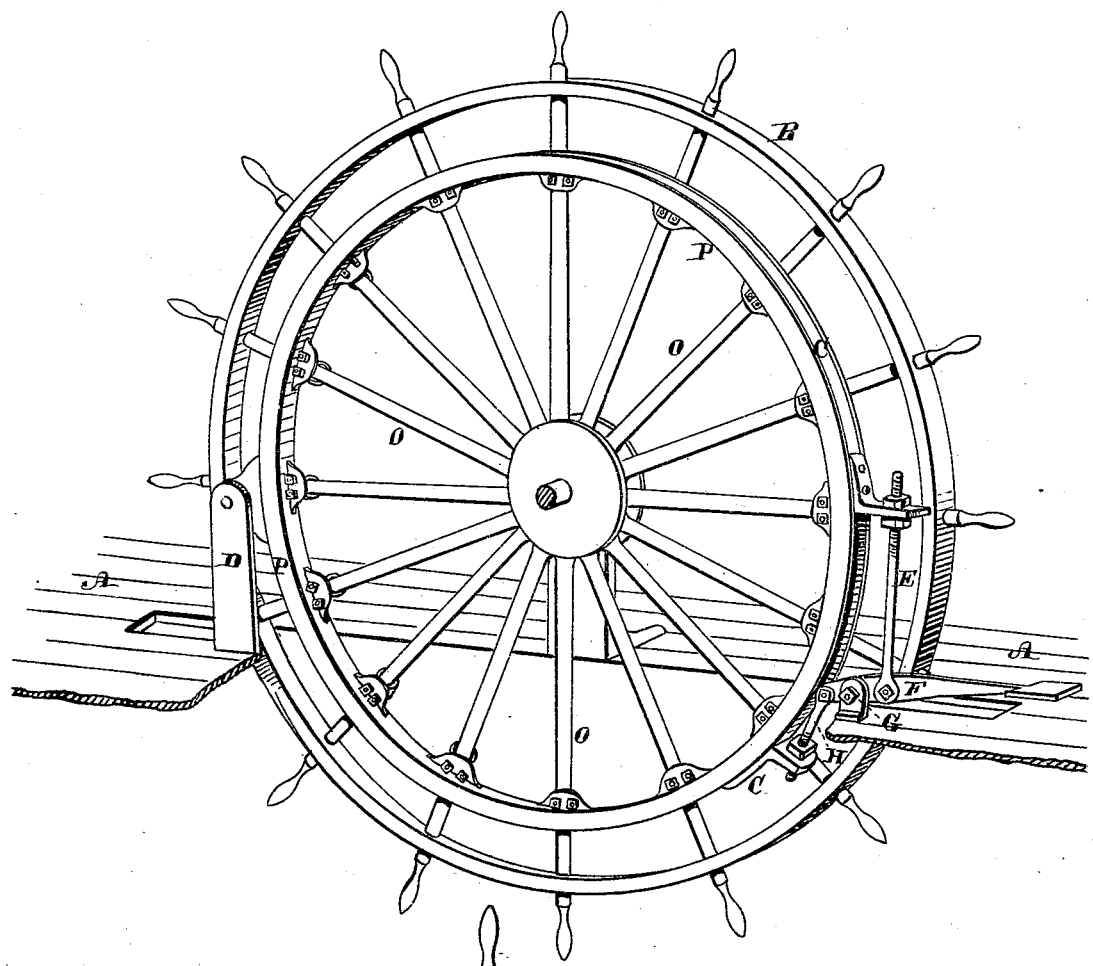
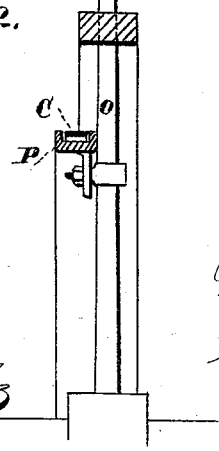

UNITED STATES PATENT OFFICE.

WALKER C. TYLER, OF STOCKTON, CALIFORNIA.

FRICTION-BRAKE FOR STEERING-WHEELS.

SPECIFICATION forming part of Letters Patent No. 253,644, dated February 14, 1882.

Application filed August 31, 1881. (No model.)

*To all whom it may concern:*

Be it known that I, WALKER C. TYLER, of Stockton, county of San Joaquin, State of California, have invented a Friction-Brake for Steering-Wheels; and I hereby declare the following to be a full, clear, and exact description thereof.

My invention relates to steering where applied brakes are necessary or convenient; and my invention consists in certain details of construction, as will be hereinafter described, whereby I am enabled to apply my brake to steering-wheels already constructed and mounted, as is hereinafter more fully described and specifically claimed.

Referring now to the accompanying drawings, Figure 1 is a perspective view of my invention. Fig. 2 is a detail.

Let A denote the floor of the pilot-house, or such other place as the steering-wheel is likely to be situated.

Let B represent the steering-wheel, which is connected with the rudder in the usual manner.

O represents the spokes of the wheel. Bolted to these spokes upon the face of the wheel, at any convenient distance from the periphery, is a cast-iron rim, P. This is secured to the spokes by means of staples or stirrups, which straddle the spokes, and are secured by nuts as they pass through lugs upon the metal rim. Around the rim P, in a suitable socket or channel cut out for it, is a metal band, C. This band is supported on one side by being connected with the standard D, which holds it up and away from the rim, but not far enough to prevent it being tightened upon the rim.

One end of the band C is connected by a rod, E, with a foot-lever, F. This lever has its fulcrum at G in the floor of the pilot-house. The end of the lever is connected with a rod, H, the other end of which is secured to the other end of the band C. The lever F is made just long enough to be in convenient position for the foot to be placed upon it when the pilot stands at the wheel. When pressure is brought to bear upon this lever it draws the ends of the band C together, thus tightening it upon the rim P and braking the wheel with sufficient force to stop it and hold it. The operation can be performed instantaneously.

The form of friction-brake here shown I deem the best and most practical for the purpose, because its force is exerted equally upon the wheel. These wheels are not usually strongly journaled, so that any great side pressure would tend to injure them; but with this frictional band no injury from that cause is likely to result.

Having thus described my invention, what I claim as new, and desire to secure by Letters Patent, is—

The steering-wheel provided with spokes O O, in combination with the removable brake-rim P, provided with fastening-lugs, in combination with the fastening-stirrups straddling the spokes and secured to the lugs, and the brake-lever and compression-band, all constructed, arranged, and operated as set forth.

In witness whereof I have hereunto set my hand.

WALKER C. TYLER.

Witnesses:
S. H. NOURSE,
FRANK A. BROOKS.